Jan. 2, 1951
W. R. BOVARD
2,536,258
RADIANT HEATED BUILDING STRUCTURE
AND TILE UNIT THEREFOR
Filed April 15, 1948
2 Sheets-Sheet 1
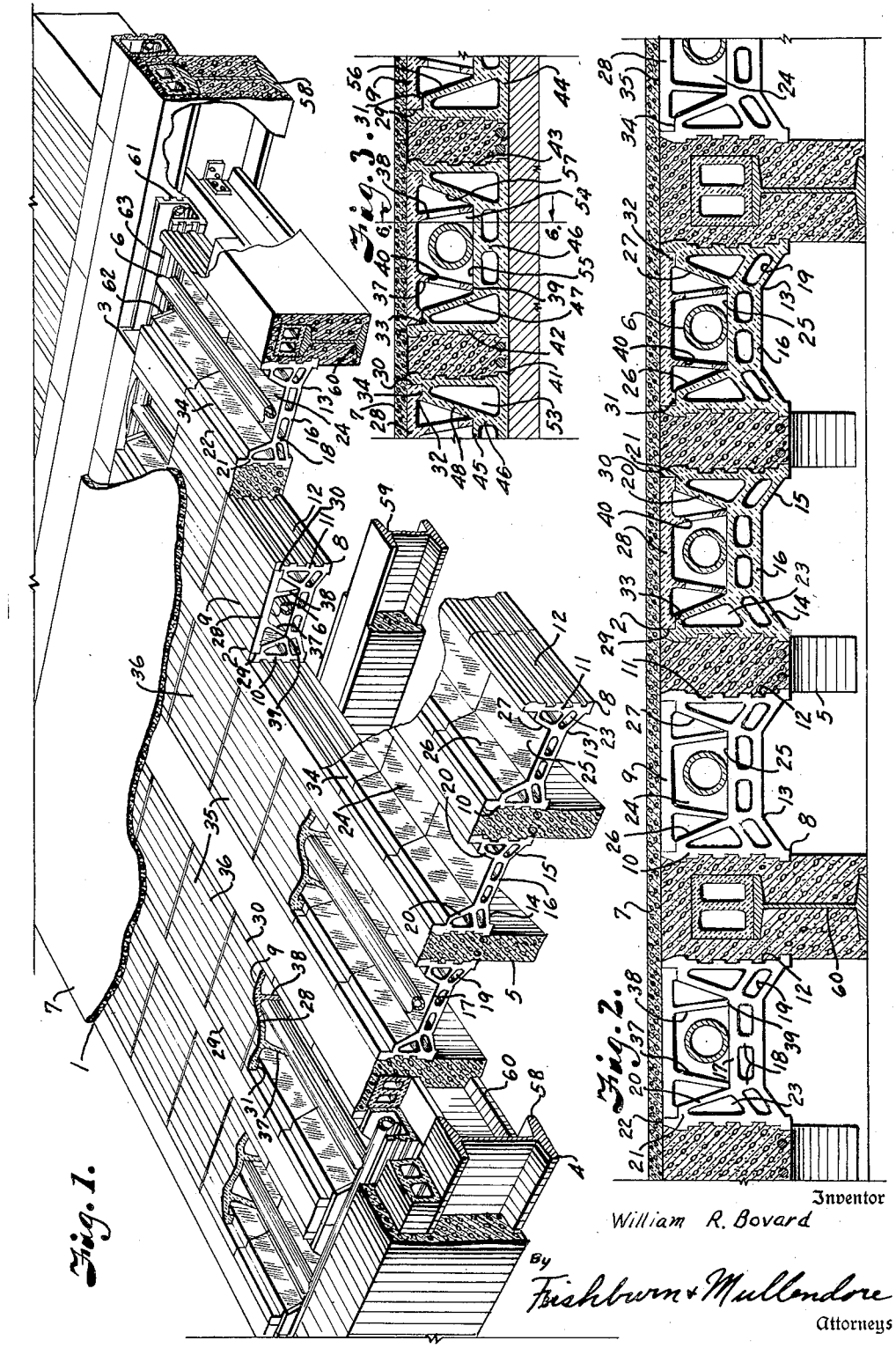
Inventor
William R. Bovard
By Fishburn & Mullendore
Attorneys

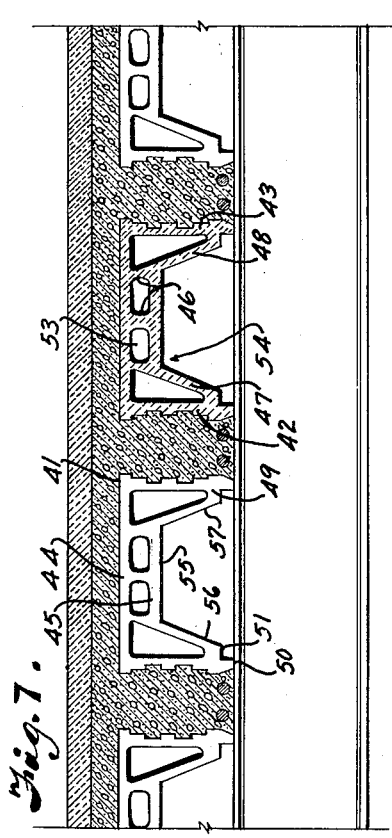

Patented Jan. 2, 1951

2,536,258

UNITED STATES PATENT OFFICE 2,536,258

RADIANT HEATED BUILDING STRUCTURE AND TILE UNIT THEREFOR

William R. Bovard, Kansas City, Mo.

Application April 15, 1948, Serial No. 21,275

6 Claims. (Cl. 237—69)

This invention relates to radiant heated building structures and more particularly to tile units and arrangement thereof in forming ducts, headers, joists and floor structures containing radiant heat piping for the heating of buildings and the like.

The objects of the present invention are to provide a building structure with ducts for containing pipe through which heating fluid or the like is circulated, reflecting surfaces and cellular walls being selectively arranged in and around said ducts for selectively directing the radiant heat therefrom; to provide tile units adapted for grouping to form ducts in a building structure for circulation of heated water or other fluid to heat said structure; to provide tile units that may be grouped to suit any room size with suitable joists having adequate reinforcement and strength to meet building requirements; to provide a tile unit with selected cellular and noncellular walls defining a duct for containing radiant heat piping, said walls controlling the distribution of heat from the tile unit; to provide a building tile unit having a duct therein with selected glazed and unglazed inner surfaces for directing heat from radiant heating devices therein; to provide a tile unit formed in sections whereby one section may be placed and joists poured therearound and the other section placed after radiant heat piping is installed, a floor topping being used to cover said other section and joists; to provide a tile section usable in a floor and adapted to be inverted and used in a roof structure; and to provide a building structure and tile therefor adapted for installation of radiant heating systems in a safe, economical construction giving quick, directed radiation and conservation of heat units, and insuring a dry floor under all conditions.

In accomplishing these and other objects of the present invention, I have provided improved details of structure, the preferred forms of which are illustrated in the accompanying drawings, wherein:

Fig. 1 is a perspective view of a building construction, portions being broken away to illustrate the arrangement of tiles, joists and piping therein.

Fig. 2 is a transverse sectional view through a building floor.

Fig. 3 is a transverse sectional view through a building floor showing installation of a ground tile unit.

Fig. 4 is a perspective view of the tile cover.

Fig. 5 is a perspective view of the ground tile section.

Fig. 6 is a longitudinal sectional view through a floor structure taken on the line 6—6, Fig. 3.

Fig. 7 is a transverse sectional view through a roof utilizing the tile section shown in Fig. 5.

Referring more in detail to the drawings:

1 designates a building structure consisting primarily of suitable tile units 2 and header blocks 3 arranged with suitable supporting structure, for example steel beams 4 and concrete joists 5 to form a floor structure containing radiant heat piping 6, said floor structure being covered by a suitable topping 7.

The building structure shown in Figs. 1 and 2 is particularly adapted for the flooring of upper stories of a building and particularly where considerable strength is desired, the steel framing, spacing of the tile units and depth of joists being variable to provide adequate strength and stiffness to meet the requirements of special conditions. The tile units 2 include base sections 8 and cover sections 9. The base section may be extruded or molded as desired, preferably formed of suitable hard-burned clay tile and includes suitably spaced side walls 10 and 11, the outer surfaces of which are provided with grooves 12 adapted to provide interengagement of said side walls with concrete or the like used as a filling between the tiles as later described. Coextensive in length with the side walls is a bottom wall 13 which includes inclined portions 14 and 15 connected with the side walls 10 and 11 respectively adjacent the lower edges thereof and sloping upwardly and inwardly, said inclined portions being connected at their upper ends by a horizontal portion 16. In the form illustrated the horizontal portion is substantially one-half the width of the base section.

Spaced upwardly from the bottom wall is an intermediate wall 17 having portions arranged substantially parallel and equally spaced from the bottom wall, a plurality of vertical partitions 18 being arranged between the bottom wall and the intermediate wall to form a plurality of passages 19 extending through the length of the base section. This arrangement of the walls provides a cellular bottom to the tile to retard heat flow therethrough.

Connected to the intermediate wall at the point of intersection of the horizontal and sloping portions thereof are outwardly sloping walls 20, the upper portions of which connect with the side walls 10 and 11 as at 21, at a point spaced below the upper edge 22 of said side walls. The sloping portions of the intermediate wall, the sloping wall 20 and the side walls cooperate to form passages 23 designed to retard flow of heat toward the side of the base section. The horizontal portion of the intermediate walls 17 and the sloping walls 20 cooperate to form a trough 24 of sufficient depth to contain radiant heat piping 6 as later described. The upper surfaces 25, 26 and 27 of the trough-forming walls preferably are glazed or coated to form a reflecting surface adapted to reflect heat upwardly through a cover section 9 as later described.

The cover section is preferably formed of hard-burned clay tile adapted to absorb and radiate heat rapidly and consists of a horizontal wall 28 coextensive with the length of the base section and of suitable width to be received between the upper portions of the side walls 10 and 11, the side edges 29 and 30 of said cover section closely engaging the side walls 10 and 11. Projecting downwardly from the wall 28, adjacent the side edges 29 and 30, are ribs 31 and 32 having flat lower faces 33 adapted to seat on flattened portions 34 in the base tile adjacent the point of connection of the sloping walls 20 and the side walls 10 and 11, the faces 34 being spaced below the upper edges 22 of the side walls 10 and 11 the same distance as the vertical height of the cover tile from the surface 33 to the upper surface 35 thereof whereby the upper surface 35 of said cover tile lies flush with the side edges 22, said upper surface 35 being scored as at 36 to aid in forming a bond with cement or the like as later described.

In order to reinforce the cover section and particularly to provide support for the span thereof between the side walls of the base section, legs 37 and 38 project downwardly from the wall 28 of said cover section, said legs diverging downwardly whereby the lower edges 39 thereof engage the upper face 25 of the horizontal portion of the intermediate wall 17 adjacent the point of connection thereof with the sloping walls 20. The legs are provided with a plurality of apertures 40, of such size and arrangement to provide adequate area for the passage of heat from the radiant heat piping 6 adapted to be arranged in the trough 24 preferably between the legs 37 and 38 and yet permit adequate strength in the legs to support the center portion of the cover section.

For first or ground floor structures, the base section 41 is preferably formed as illustrated in Figs. 3 and 5, wherein the side walls 42 and 43 are integral with and extend upwardly from side edges of a bottom wall 44, said bottom wall preferably being in a plane perpendicular to the side walls. Spaced upwardly from the bottom wall 44 is an intermediate wall 45 connected with the bottom wall by means of a plurality of vertical ribs 46. The intermediate wall 45 is shorter in width than the bottom and terminates in upwardly and outwardly directed walls 47 and 48, the upper ends of which connect with the side walls as at 49 below the upper edges 50 thereof, said sloping walls 47 and 48 being flattened as at 51 adjacent the point of connection with said side walls to form a seat adapted to receive the ribs 31 and 32 of the cover section 9.

The spaced relation of the intermediate wall 45 and sloping walls 47 and 48 from the bottom wall 45 and side walls 42 and 43, together with the vertical ribs 46, provides through passages 53 forming a cellular structure adapted to resist the flow of heat therethrough. The intermediate wall 45 and sloping walls 47 and 48 cooperate to form a trough 54, the upper surfaces 55, 56 and 57 thereof being glazed or coated with suitable material to provide a reflecting surface for directing heat upwardly in the same manner as the base tile 8. Also the ground tile 41 is adapted to receive the cover section with the legs 37 and 38 arranged in the trough 54 in the same manner as described relative to the base section 8.

In utilizing the tile units in constructing a building and installing radiant heating therein, the respective sections are selected and grouped in such a manner that desired strength in the building structure may be obtained. Where the building is large requiring steel framing, suitable girder members 58 are supported in a conventional manner on columns (not shown). Additional structural members 59 and 60 are secured to the girders to provide longitudinal and transverse members as required for supporting the required loads. Suitable supports and forms are then arranged relative to the steel members for supporting the tile sections and providing forms for concrete joists. Suitable open topped header blocks 61, preferably formed of tile, are then arranged adjacent the girders 59 on opposite sides of a floor panel, said header blocks preferably having openings 62 in the side walls adapted to align with the trough 24 of the base sections 8 which are arranged in spaced rows as illustrated in Figs. 1 and 2, the ends of the base section at the ends of each row engaging the sides of the header tile 61 and the other base sections in said row having their ends in abutting engagement. The spacing between the rows of spaced sections may be arranged as desired, for example to provide a plain, grouted concrete joint, or for reinforced concrete joists and for joists including steel framing, filler tile and fireproofing tile such as is provided in conventional building structures.

After the base sections are arranged as desired in suitable spaced rows, the grouted joints and concrete joists can be poured from light runboards or platforms, the concrete entering the grooves 12 in the sides of the base sections providing a secure bond therebetween. After the cement is set, any type of radiant heat piping can be installed in the troughs of the header and base tiles and tested before the cover units and floor topping are installed. The radiant heat piping is placed in the troughs, on suitable chairs, for example laid cradles or otherwise supported on the glazed surface 25 of the intermediate walls 17, the ends of the respective lines of heat piping being connected to the header pipes 63, arranged in the header tile 61, one of said header pipes being connected to a suitable source of heating fluid and the other header pipe connected to a suitable return to provide for circulation under pressure if desired of such heating medium through the radiant heat piping. The piping is free to expand and contract and may be arranged in groups, valved and otherwise installed to maintain zone control. Selected portions of the heat piping may be covered with insulating material or otherwise treated to reduce the heat delivered by that portion of the pipe and increase the relative amount of heat from the exposed portions of the pipe. Also sections of finned type pipe may be utilized to increase the amount of radiated heat where required. After the piping is installed and tested the cover sections 9 are placed in the base sections with the ribs 31 and 32 seated on the surfaces 34 with the legs 37 and 38 extending into the trough 24 and resting on the intermediate wall 17 of the base section. A suitable floor topping of concrete or the like then may be run over the top faces of said cover sections, joists and joints between the tile, this floor topping entering the scored spaces 35 of the cover section to facilitate the bonding therewith.

Heating fluid may be applied to one of the header pipes, circulated through the radiant heat piping 6 and returned to the heating system through the other header pipe at the opposite end of the floor panel. The heat is radiated from the piping into the trough 24, the cellular bottom and sides of the base section retarding heat flow therethrough thereby cooperating with the glazed or reflecting surfaces 25, 26 and 27 to direct the heat upwardly through the unglazed and noncellular cover sections which will absorb and radiate heat rapidly and afford quicker radiant heating results.

In structures not requiring steel framing, the base section 41 illustrated in Figs. 3 and 5 may be used. In such structures the base section may be placed on the ground or other suitable support in aligned, spaced rows with header tile arranged at the ends of said rows and suitable concrete poured to provide grouted joints or joists as desired. After the concrete has set, suitable radiant heat piping is installed and tested, then the cover units are placed on the base tiles and suitable floor topping applied to the upper surface thereof. The end joints of the base tile can be caulked or filled with tested, waterproofed caulking compound if necessary. With this arrangement the cellular bottom and sides resist the flow of heat therethrough and the reflecting surfaces 55, 56 and 57 direct the heat upwardly through the cover section. This system assures a safe, economical construction and a continuous saving through the quick radiation and conservation of heat units. It also assures a dry floor under all conditions.

The base section 41 may also be used for commercial roof construction as illustrated in Fig. 7. In such structures said base section is inverted and suitably supported while concrete is poured between the rows thereof to form suitable joints. Obviously the tile may be used in the roof construction with or without the concrete slabs and/or additional insulation to provide an insulated gas and fumeproof construction wherein the reflecting surfaces 55, 56 and 57 provide both light and heat reflection values. Obviously the tile sections can be used for exterior walls as a stucco base with an inner wall of metal lath or plaster, gypsum blocks or standard hollow tile forming a rigid two or three cell wall structure of adequate strength and stiffness for any residential or curtain wall construction.

It is believed obvious that I have provided a radiant heating building structure and tile unit therefor adapted to conform to standard modular grid layouts, capable of utilization of various parts of a building and designed to provide an efficient radiant heating system wherein the heat is directed through the floor into the room to be heated and is not dissipated into the structure below the floor.

What I claim and desire to secure by Letters Patent is:

1. In a radiant heating and circulatory system comprising a plurality of rows of aligned tiles each row forming a unit, said tiles being provided with aligned internal passages in continuous and uninterrupted communication with one another longitudinally of the respective units to provide separate internal conduits through said units, glazed surfaces in the passages on the bottom and sides thereof, said passages being disposed immediately beneath the upper surface of the tiles for the reflection of heat thereto for radiation to the space thereabove, a plurality of aligned header tiles arranged in a row at the end of and transversely of said respective units, said aligned header tiles being provided with aligned internal passages in continuous and uninterrupted communication with one another and having communication with the internal passages of the respective units, header piping arranged in the passages of the header tile and adapted to supply heated fluid, and radiant heating piping arranged in the internal passages of the respective units, said radiant heating piping having communication at its end with the header piping for flow of heating fluid through the radiant heating piping whereby the heat of the fluid is radiated from the radiant heated piping into the internal passages for reflection toward the upper surface for radiation of heat to the space thereabove.

2. In a radiant heating and circulatory system comprising a plurality of rows of aligned tiles each row forming a unit, said tiles being provided with aligned internal passages in continuous and uninterrupted communication with one another longitudinally of the respective units to provide separate internal conduits through said units, heat reflecting surfaces in the passages on the bottom and sides thereof, said passages being disposed immediately beneath the upper surface of the tiles for the reflection of heat thereto for radiation to the space thereabove, a plurality of aligned header tiles arranged in a row at each end of and transversely of said respective units, said aligned header tiles being provided with aligned internal passages in continuous and uninterrupted communication with one another and having communication with the internal passages of the respective units, header piping arranged in the passages of the header tile, the pipe in one row of header tile being adapted to supply heated fluid and the header piping in the other row of tile being adapted to return the heated fluid to the source of supply, and radiant heating piping arranged in the internal passages of the respective units, said radiant heating piping having communication at its ends with the respective header piping for flow of heating fluid through the radiant heating piping whereby the heat of the fluid is radiated from the radiant heated piping into the internal passages for reflection toward the upper surface for radiation of heat to the space thereabove.

3. In a radiant heating and circulatory system comprising a plurality of rows of aligned tiles having cellular side and bottom walls, each row forming a unit, said tiles having upper surfaces disposed in coplanar relation in said units and being provided with aligned internal passages in continuous and uninterrupted communication with one another longitudinally of the respective units to provide separate internal conduits through said units which are out of communication with one another between the ends of said respective units, glazed surfaces in the passages on the bottom and sides thereof, said passages being disposed immediately beneath the upper surface of the tiles for the reflection of heat thereto for radiation to the space thereabove, a plurality of aligned header tiles arranged in a row at each end of and transversely of said respective units, said aligned header tiles being provided with aligned internal passages in continuous and uninterrupted communication with one another and having communication with the internal passages of the respective units, header piping arranged in the passages of the header tile, the pipe in one row of header tile being adapted to supply heated fluid and the header piping in the other row of tile being adapted to return the heated fluid to the source of supply, and radiant heating piping arranged in the internal passages of the respective units, said radiant heating piping having communication at its ends with the respective header piping for flow of heating fluid through the radiant heating piping whereby the heat of the fluid is radiated from the radiant heated piping into the internal passages for reflection toward the upper surface for radiation of heat to the space thereabove.

4. In a radiant heated building structure comprising a plurality of rows of aligned open top tile formed of cellular side and bottom walls, each row forming a unit, the tile walls forming aligned troughs in continuous and uninterrupted communication with one another longitudinally of the respective units to provide separate troughs through said units, heat reflecting surfaces in the troughs on the bottom and sides thereof, rows of open top header tile arranged transversely of the respective units to provide a continuous header trough at the end of the respective units and in communication with the aligned troughs thereof, concrete in the spacing between the rows of aligned tile to form the joints therebetween and provide a floor supporting structure, a header pipe arranged in the trough of the row of header tile, said pipe serving as a supply for heating fluid, radiant heat piping arranged in the troughs formed by the respective rows of aligned tiles, said piping having communication with the header pipe for flow of heating fluid therethrough, cover plates arranged on the side walls of the respective tile and header tile, said cover plates having upper load supporting surfaces disposed in coplanar relation in said units and with the concrete between the tile, and a floor covering on the cover plates and concrete to provide a floor surface, the heat from the radiant heating piping being reflected upwardly in the troughs for radiation into the cover tile and floor topping to heat the space thereabove.

5. In a radiant heated building structure comprising a plurality of rows of aligned open top tile formed of cellular side and bottom walls each row forming a unit, the upper edges of said tile side walls being disposed in coplanar relation and the tile walls forming aligned troughs in continuous and uninterrupted communication with one another longitudinally of the respective units to provide separate troughs through said units which are out of communication with one another between the ends of the respective units, glazed surfaces in the troughs on the bottom and sides thereof, rows of open top header tile arranged transversely of the respective units to provide continuous header troughs at each end of the respective units and in communication with the aligned troughs thereof, concrete in the spacing between the rows of aligned tile to form the joints therebetween and provide a floor supporting structure, header pipes arranged in the troughs of the header tile, one of said pipes serving as a supply for heating fluid and the other for the return of same, radiant heat piping arranged in the troughs formed by the respective rows of aligned tiles, said piping having communication at their ends with the respective header pipe for flow of heating fluid therethrough, cover plates arranged on the side walls of the respective tile and header tile, said cover plates having upper load supporting surfaces disposed in coplanar relation in said units and with the concrete between the tile, and a floor covering on the cover plates and concrete to provide a floor surface, the heat from the radiant heating piping being reflected upwardly in the troughs for radiation into the cover tile and floor topping to heat the space thereabove.

6. In a radiant heating and circulatory system comprising, a plurality of rows of aligned tiles each row forming a unit, said tiles being provided with aligned internal passages and continuous and uninterrupted communication with one another longitudinally of the respective units to provide separate internal conduits through said units, glazed surfaces in the passages on the bottom and sides thereof, said passages being disposed immediately beneath the upper surface of the tiles for the reflection of heat thereto for radiation to the space thereabove, and radiant heating piping arranged in the internal passages of the respective units, said radiant heating piping having communication with a source of heating fluid for flow of heating fluid through the radiant heating piping whereby the heat of the fluid is radiated from the radiant heated piping into the internal passages for reflection toward the upper surfaces for radiation of heat to the space thereabove.

WILLIAM R. BOVARD.

REFERENCES CITED

The following references are of record in the file of this patent:

UNITED STATES PATENTS

| Number | Name | Date |
|---|---|---|
| 2,090,285 | Christie et al. | Aug. 17, 1937 |
| 2,422,685 | Keck | June 24, 1947 |